G. H. JUDY.
DEVICE FOR MAKING A WHEEL FIT ON AXLES FOR LOCOMOTIVES AND TENDERS AND CAR WHEELS.
APPLICATION FILED MAY 12, 1912.
1,178,926.
Patented Apr. 11, 1916.
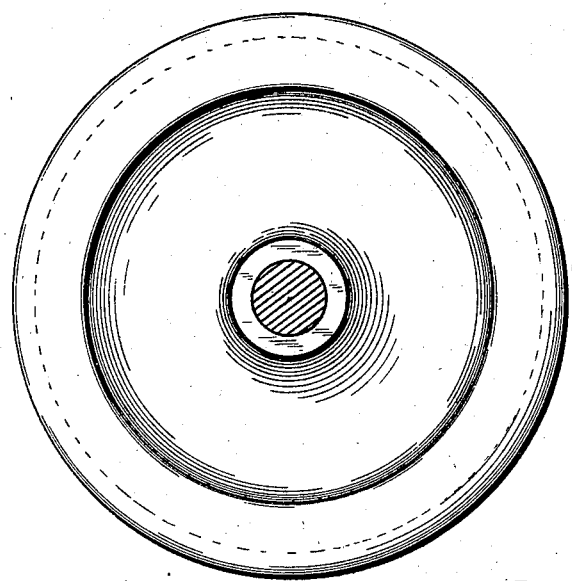
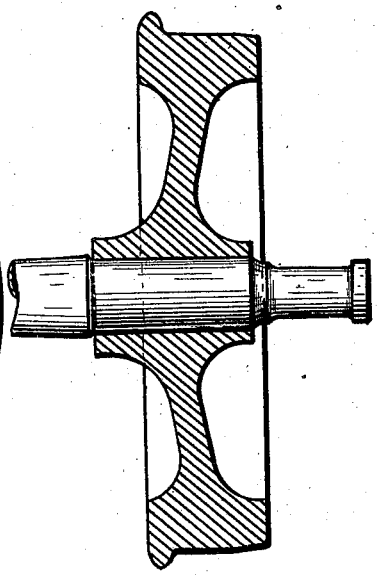
Fig. 3.    Fig. 4.
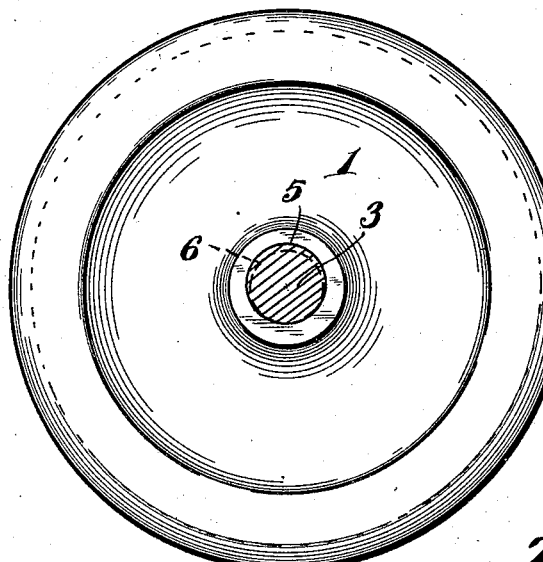
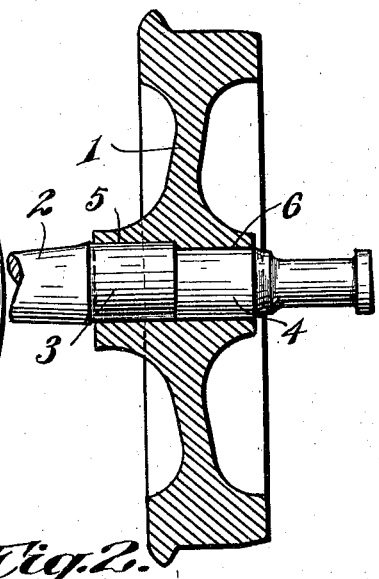
Fig. 1.    Fig. 2.
Witnesses:    Inventor

UNITED STATES PATENT OFFICE.

GEORGE H. JUDY, OF CHICAGO, ILLINOIS.

DEVICE FOR MAKING A WHEEL FIT ON AXLES FOR LOCOMOTIVES AND TENDERS AND CAR-WHEELS.

1,178,926.  Specification of Letters Patent.  Patented Apr. 11, 1916.

Application filed May 12, 1915. Serial No. 27,658.

*To all whom it may concern:*

Be it known that I, GEORGE H. JUDY, a citizen of the United States, residing at 3845 Ellis avenue, Chicago, county of Cook, and State of Illinois, have invented a new and original Device for Making a Wheel Fit on Axles for Locomotives and Tenders and Car-Wheels for All Kinds of Railroad Cars and Locomotives and Tenders, of which the following is a specification.

My invention relates to a new and original plan for making a double wheel-fit on axles for locomotives and tenders and car wheels and axles. And the object of my improvement is, first, to provide a plan of a car wheel-fit complete on axles that will be safe. Second, a plan that will prevent the car wheel from coming loose on the axle and causing a wreck. I attain these objects by the mechanism illustrated by the accompanying drawings, in which:—

Figure 1.— is a back view of wheel with details of axles and hub. Fig. 2.— is a section of wheel and axle showing axle fitting into wheel in detail, according to my invention. Figs. 3 and 4.— represent in plan and in section, the usual means employed in fitting an axle in a car wheel.

1,—in Fig. 2 shows a section of the wheel. 2,—is axle. 3,—shows axle fitted into wheel hub and cam on axle. This cam is machined on the axle to fit back part of wheel hub, and is thrown out of center sufficiently to form a lock when pressed into the wheel hub at 5.

4,—is front of axle fitted into wheel at 6. This part of wheel-fit is central with axle and wheel with the wheel hub bored as per drawing at 5 and 6, to closely fit the eccentric and the centric seats on the axle.

I claim—

The combination of an axle provided with two adjoining bearings, one of which is eccentric to the axis thereof, with a wheel hub having corresponding seats.

GEORGE H. JUDY.

Witnesses:
 W. S. McCALL,
 MINNIE L. McCALL.

Copies of this patent may be obtained for five cents each, by addressing the "Commissioner of Patents, Washington, D. C."